United States Patent [19]

Kine

[11] 3,957,138

[45] May 18, 1976

[54] AUTOMATIC ADJUSTING DEVICE FOR A BICYCLE

[75] Inventor: Masayoshi Kine, Sakai, Japan

[73] Assignee: Shimano Industrial Company, Limited, Osaka, Japan

[22] Filed: Sept. 30, 1974

[21] Appl. No.: 510,728

[30] Foreign Application Priority Data

Oct. 4, 1973  Japan............................ 48-112548
Feb. 13, 1974  Japan............................ 49-18305
Apr. 4, 1974  Japan............................ 49-39058

[52] U.S. Cl. ............................ 188/196 F; 74/489; 188/2 D
[51] Int. Cl.² ........................................ F16D 65/56
[58] Field of Search........... 74/489, 501 R; 188/2 D, 188/24, 26, 196 F, 196 BA

[56] References Cited
UNITED STATES PATENTS
2,466,363   4/1949   Bodinaux et al................. 74/489 X

*Primary Examiner*—Duane A. Reger
*Attorney, Agent, or Firm*—Stevens, Davis, Miller & Mosher

[57] ABSTRACT

An automatic adjusting device for a bicycle brake exerted by stretching a control cable comprising an outer cable and an inner wire, which is adapted to be provided at the retaining side of the outer cable thereof with an adjusting member, at the retaining side of the inner wire with an actuating member, and between both members with a clutch spring so that the length of the outer cable relative to that of the inner wire may automatically be corrected.

5 Claims, 12 Drawing Figures

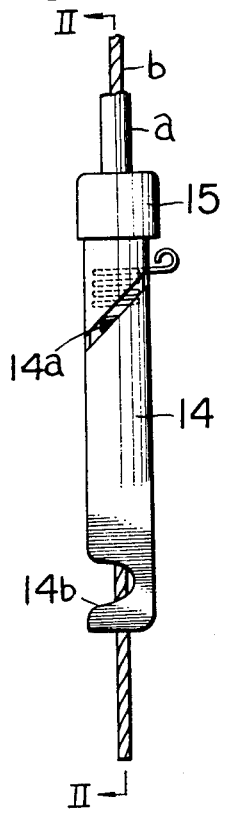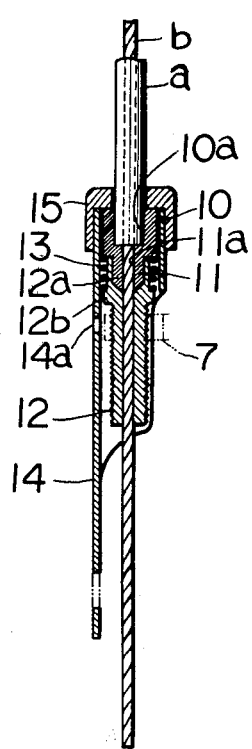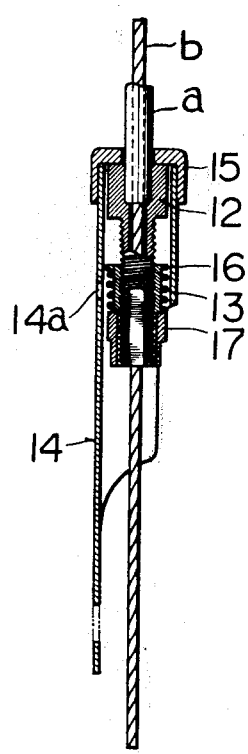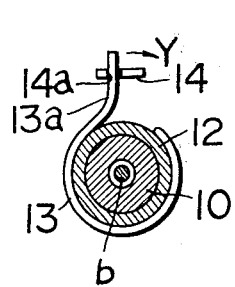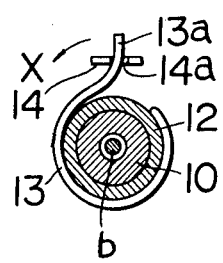

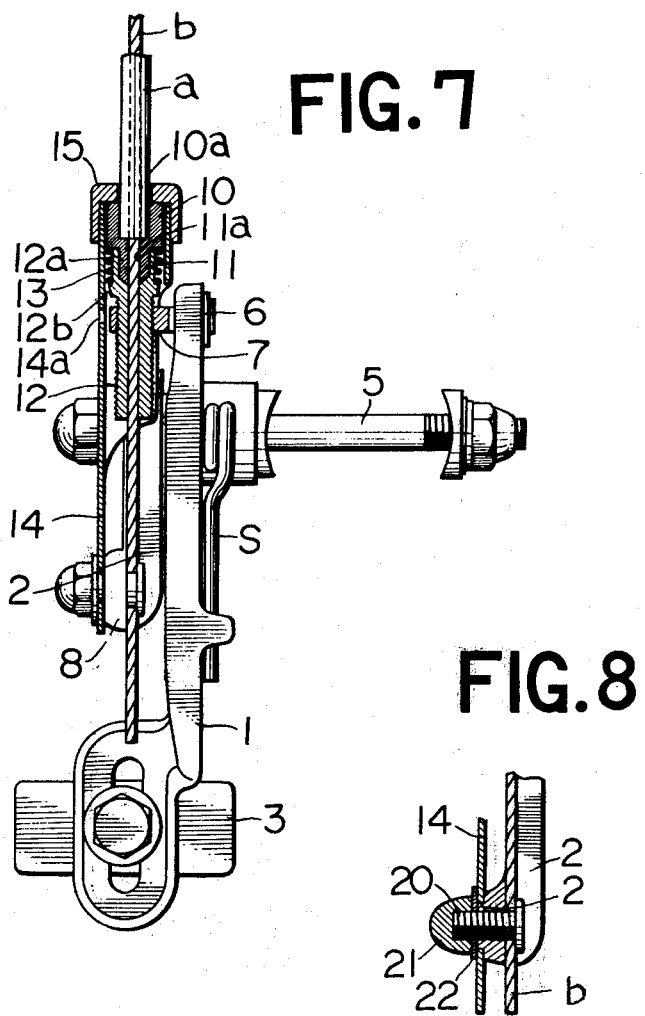

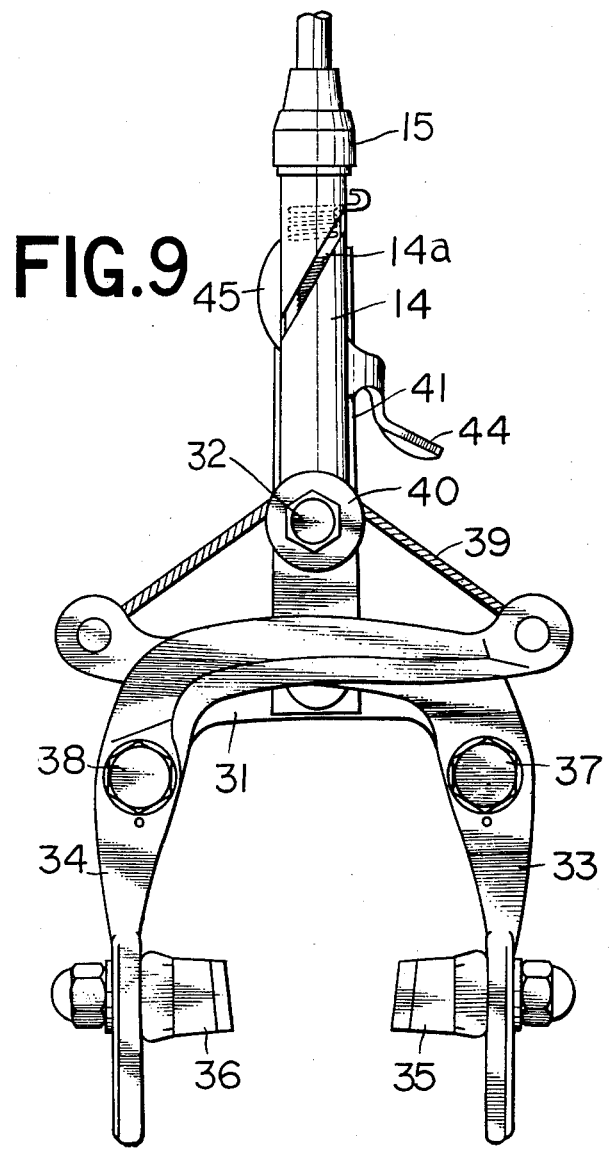

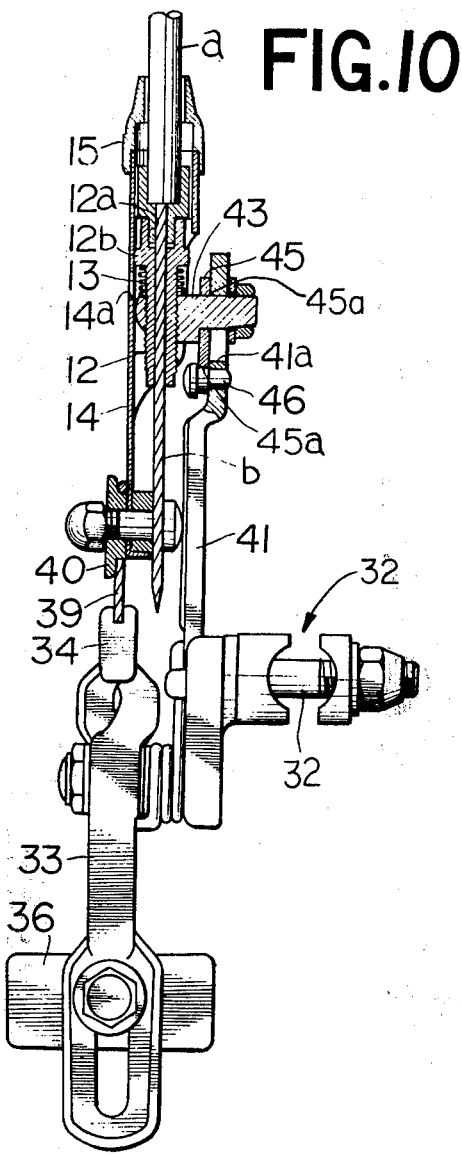

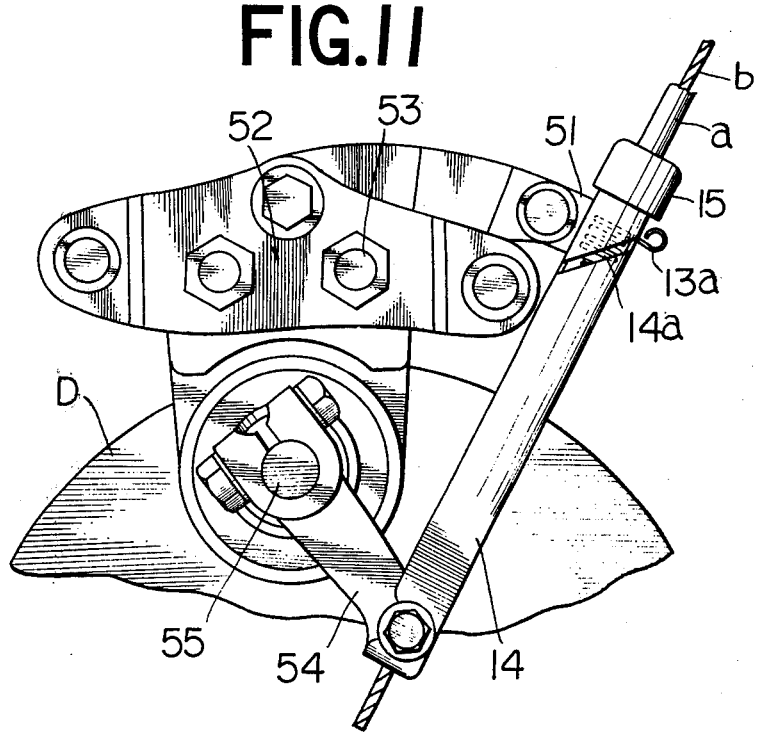

AUTOMATIC ADJUSTING DEVICE FOR A BICYCLE

This invention relates to an automatic adjusting device mainly for a bicycle brake such as a calliper brake or the like, which is adapted to be exerted by stretching of a control wire comprising an outer cable and an inner wire.

Conventionally, such a brake is so constructed that the adjustment of fluctuant length of the outer cable relative to that of the inner wire in case of elongation of the latter, a reduced length of the former, or wear of the brake pads, has been carried out by means of screwably mounting an adjusting bolt to a bracket member pivotally supporting the main body of operating lever, which adjusting bolt is tightened by means of a lock nut so that it may be prevented from being released during movement of the bicycle.

However, such conventional construction is required to be adjusted in a manner that the bolt is screwed forward to be adjusted after release of the lock nut, and then the lock nut must again be tightened to hold the adjustment; consequently, there have been such defects as a troublesome adjustment and the occurence of risk caused by inaccurate brake action due to negligence of the adjustment.

Now, the present invention has been designed in view of these defects, of which a main object is to provide an automatic adjusting device capable of automatically correcting a control cable length variation in a case that wear of brake pads makes larger the clearance between the same and a brake-exerted member to thereby resulting in an inaccurate brake exertion, or elongation of an operating wire causes the outer cable to be varied in length relative to the wire. Another object of the invention is to provide an adjusting device capable of exerting the abovementioned correction automatically exactly at every braking action.

Still another object is to provide an automatic adjusting device capable of being applied to any brake system employing a control wire such as of course a calliper brake of center-pull system, as well as a side-pull system, a disc brake or a hand brake.

Still a further object of the invention is to provide an automatic adjusting device capable of being used again at an original non-adjustment condition thereof, after replacement of worn brake pads by new ones.

Other objects of the invention will be apparent from the embodiments described hereinafter in accordance with the accompanying drawings, in which:

FIG. 1 is a front view of an adjusting device of the invention,

FIG. 2 is a sectional view thereof taken on Line II—II in FIG. 1

FIG. 3 is a sectional view of a modified embodiment of the invention,

Figure 6:
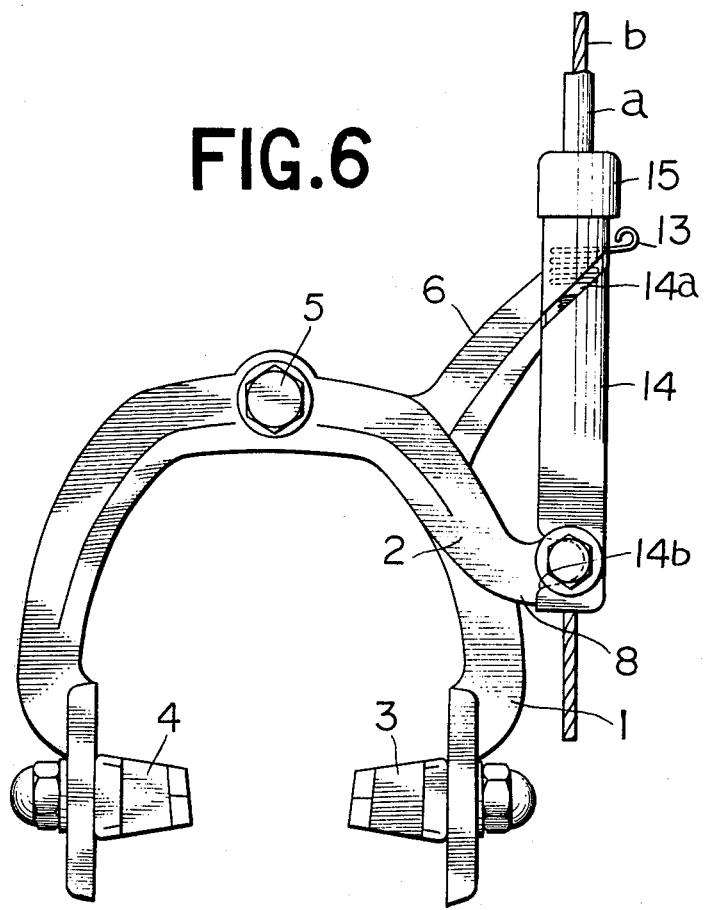
Figure 12:
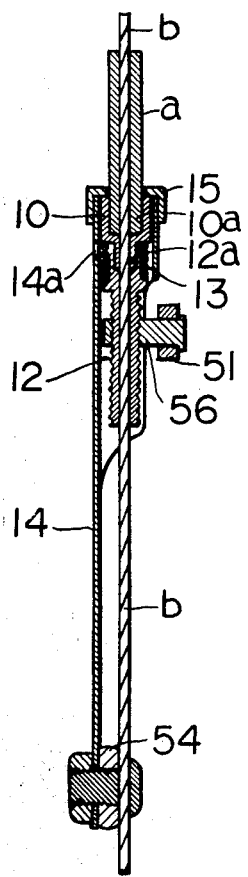

FIGS. 4 and 5 illustrate a clutch spring in action, showing an integrated state thereof with an adjusting member and a normal state thereof respectively, and FIGS. 6 to 12 show applications of the adjusting device of FIG. 1 to the following brake systems, namely, FIG. 6 is a front view of one embodiment applied to a side-pull system calliper brake, FIG. 7 is a partially cutaway side view thereof, FIG. 8 is a sectional view showing attachment of an actuating member, FIG. 9 is a front view of an embodiment applied to centerpull system calliper brake, FIG. 10 is a partially cutaway side view thereof, FIG. 11 is a front view of an embodiment applied to a disc brake, and FIG. 12 is a sectional view of FIGS. 11 with parts ommitted therefrom.

Referring to FIGS. 1 to 3, the numeral reference 10 denotes a retainer having a hole 10a for retaining one terminal of an outer cable, which is formed of an inserted member 11 extending integrally with the retainer from the center of one end thereof and having the head of a conical shape, which inserted member 11 is provided at the center thereof with a hole 11a which communicates with the retainer hole 10a and has inserted therethrough an inner/with wire.

The numeral reference 12 denotes an adjusting member which is rotatably mounted to the retainer 10A, the root portion of the adjusting member 12 is cylindrically shaped and has at the center thereof a hole 12a receiving the inserted member 11. At one end of the root portion toward the head of the adjusting member, is provided a flange 12b slightly larger in diameter than the root portion and at the portion toward the head from the flange is provided a screw thread of a given pitch.

The adjusting member 12 is, as described hereinafter screwably supported to a fixed support (called a first support, in the invention) which is fixed to, for example, a brake arm of a sidepull system calliper brake.

The screwable movement of the adjusting member 12 makes the retainer 10 move in an axial direction to shift the position thereof thereby carrying out the adjustment.

Incidentally, the adjusting member 12 may be formed integrally with the retainer 10, but it is preferable to be so constructed that the latter is formed separately from the former so that the adjusting member 12 may be rotatable relative to the retainer 10.

The numeral reference 13 denotes a clutch spring of a coiled type, wound up around the outer periphery of the root of adjusting member 12, which spring is wound so as not to be retained at both ends thereof to the abovementioned outer periphery and also is bent at one end thereof radially outwardly of the adjusting member so as to be formed in a straight end 13a.

A winding direction of the spring 13 is such that when the straight end 13a is turned in the forward screw direction of the adjusting member 12 the spring tightens the root portion of the adjusting member 12 to be integrated therewith; on the contrary, in the backward screw direction the spring is released from the root portion. Consequently, when the straight end 13a is turned in the coil spring winding direction, that is, the direction of an arrow Y in FIG. 4, the clutch spring becomes integral with the adjusting member 12 so that the rotation of the former may be transmitted to the latter, while, in the releasing direction, i.e., the direction of an arrow X in FIG. 5, the clutch spring becomes free from the outer periphery of the root portion so that the clutch spring 13 may only turn independently of the adjusting member 12.

The numeral reference 14 denotes an actuator with a control groove 14a receiving therein the straight end 13a of the clutch spring 13, which actuator is formed of a piece of a plate one end of which is provided with a recess 14b serving to fix the actuator to a support (in the invention called a second support) such as a brake arm of a side-pull system calliper brake to be described hereinafter, which retains one end of the inner wire b to the support.

The other end of the actuator extends to the retainer 10 for being formed in a sleeve curled in a substantially cylindrical shape, which sleeve is movably inserted to the outer periphery of the retainer 10. In addition, a cap 15 is used to cover the sleeve.

The control groove 14a is formed at the cylindrical extention of the sleeve, which is, as shown in FIG. 1, slanted at a given angle and larger in width than the wire diameter of clutch spring 13 so that the straight end 13a may be movable in the range of the width of the groove; thus the movable range of the straight end is made to be a proper clearance between, for example, calliper brake pads and a wheel rim.

The first and second supports are relatively movable by stretching of the inner wire b, where the control groove 14a is upwardly displaced by the relative movement of both the supports in an upward movement of the actuator 14 as shown in FIGS. 1 and 2. When the actuator 14 moves following the movement of a brake arm 2, the control groove 14a is displaced to be engaged with the straight end 13a of the clutch spring 13. At this shifted position, the clutch spring 13 becomes nonrotatable in a normal braking action.

However, when both the supports may be relatively moved beyond a given range, the straight end 13a rotates along the control groove 14a to the extent of a rotary angle to meet the movement in the relation to the angle of inclination of the groove, namely, the straight end 13a is made to be rotatable in the direction X as shown in FIG. 5 at the braking action and in the direction Y in FIG. 4 at the brake release.

The invention may be constituted as shown in FIG. 3 in another embodiment.

In FIGS. 1 and 2, and adjusting member 12 is directly screwably engaged with the first support, however, it is preferred that a rotary member 16 is as shown in FIG. 3, screwably engaged with the adjusting member 12, so that the latter may be made nonrotatable to be screwably moved by the rotation of the rotary member 16.

In such a case, the first support may be provided with a square hole perforated therethrough and the adjusting member 12 may be formed at the utmost end thereof in a shape corresponding to the square hole, and also a detent 17 may, as shown in FIG. 3, be provided for preventing rotation of the adjusting member.

Referring to FIG. 3, into the square hole of the first support is inserted the detent 17 having at its center a square hole which is inserted with the outwardly squared end of the adjusting member 12 in the relationship of only free movement therewith, the rotary member 16 is screwably engaged with the thread the adjusting member 12, and the clutch spring 13 is wound up around the outer periphery of the rotary member 16, whereby one end surface in the axial direction of the rotary member 16 is brought into contact with the detent 17. Accordingly, the clutch spring 13 is tightened to make the rotary member rotate, which rotary member 16 is restricted from movement by means of the detent 17 resulting in making the adjusting member 12 move in an axial direction.

The device of the invention, principally constructed as aforesaid, is applicable for brake means of a bicycle as shown in FIGS. 4 to 12.

Next, a representative embodiment of such construction will be described in the following regarding a side-pull system calliper brake, a center-pull system calliper brake and a disc brake.

First, the application to a side-pull system calliper brake will be described in accordance with FIGS. 6 and 7, which brake is well known.

In FIGS. 6 and 7, the numeral references 1 and 2 denote brake arms with brake pads 3 and 4 respectively, which are relatively movably pivoted to each other by means of a mount bolt 5 for attaching the brake means to the frame member (not shown) of a bicycle A supporting arm 6 extends from the intermediate portion of one arm 1 to be integral therewith and also an idle end of the other arm 2 is bent so as to oppose to the end of the supporting arm 6 in a substantially perpendicular line of the bicycle.

In this brake means, the first support 7 is fixed to the utmost end the arm 6 and the second support 8 is an idle end of the arm 2, the actuator 14 is fixed to the second support 8 in a manner that a bolt 20 for retaining one end of the inner wire b is inserted into the recess 14b to be fastened thereto. For this construction, the second support arm 8 is applied with padding around a bolt hole thereof so that a gap may be formed between a washer 22 and the end face of the second support 8 in a state that a cap nut 21 is screwably tightened to the bolt for fixing the inner wire b thereto, the actuator 14 being inserted into the gap in the lateral direction thereof.

Furthermore, when arms 1 and 2 are relatively moved in a given range, the straight end 13a is, as shown in FIG. 5, positioned into the control groove 14a of the actuator 14, resulting in transmitting no rotary force to the clutch spring; therefore, even in reciprocating motion of the actuator 14 together with the arm 2 the clutch spring 13 does not function at all and also the adjusting member 12 does not rotate, thereby enabling the carrying out of a normal brake action.

During such brake exertion, wear of the brake pads or elongation of the inner wire b causes the arms 1 and 2 to be relatively moved beyond a given range; then the actuator 14 becomes more movable together with the arm 2, whereby the slant portion of the groove 14a of the actuator 14 becomes a guide for the straight end 13a of the clutch spring 13.

Upon being guided by the slanted groove, the straight end 13a forces the clutch spring 13 to be rotated in a direction of the arrow X in FIG. 5 so that the clutch spring is displaced relative to the adjusting member 12, and when the arm 2 is restored to the original position after finishing the brake action, i.e., when the actuator 14 is restored, the clutch spring 13 is forced to be rotated in the arrow Y direction in FIG. 4.

Since the clutch spring 13 is integral with the adjusting member 12 when it is rotated in the arrow Y direction, the adjusting member 12 is forced to be simultaneously rotated resulting in that the adjusting member 12 is axially outwardly moved, whereby the outer cable a retained position is shifted so that the outer cable a may be adjusted in length relative to the inner wire b. The adjustment of the outer cable length may hold the relative movement of the arms 1 and 2 always constant because the fluctuation of the operating cable length caused by wear of the brake pads may be absorbed to be negligible and also such adjusting operation is carried out individually of the functioning of arms 1 and 2 thus a desirable adjustment is available after several times of adjusting operations.

Next, an embodiment applied on a center-pull system calliper brake will be described in accordance with FIGS. 9 and 10, which brake system is also well known. Referring to FIGS. 9 and 10, the numeral reference 31 denotes a gate fixed to the bicycle frame (not shown), at the center of which is provided a bolt 32 perforating throughout the frame and also at both sides of the gate are swingingly movably supported through arm bolts 37 and 38 brake arms 33 and 34 having brake pads 35 and 36 respectively. At each utmost end of the arms 33 and 34 there is attached a single wire 39 which is supported at the intermediate portion thereof with a detent 40 for retaining a terminal of the inner wire b thereto.

The numeral reference 41 denotes an arm fixed to the gate 31, which is formed longer than the distance between the gate 31 and the detent 40, being fixed in the direction of stretching the inner wire b.

At the end portion of arm 41 is provided a slot 41a in which is insertibly movably mounted a support 43 for supporting one terminal of the outer cable b and also at the root portion of the support 43 is pivotally mounted a cam plate 45 having an operating lever 44 composed of a guick-release mechanism. In addition, a fixed pin 46 serves to be in contact with the face of the cam plate 45 for permitting the support 43 to be moved and also to be engaged with the retaining portion 45a of the cam plate 45, which pin fixes the support 43 at the position after movement thereof and simultaneously restricts the cam plate 45 from rotation thereof.

In such brake system, the first support is the support 43 and the second one is the detent 40. Incidentally, the actuator 14 is, as the same as the abovementioned side-pull system, fixed to the detent 40 and so functions.

Another embodiment applied to a disc brake will be described on the basis of FIGS. 11 and 12, which is also well known.

The numeral reference 51 denotes a bracket member fixed to a bicycle frame (not shown), which is provided with a brake body 52 slightly movable through a mount bolt 53. The body 52 is as a whole substantially U-shaped at the lateral side thereof so that a disc D rigidly attached to a bicycle wheel may be inserted thereinto.

The body 52 is formed of two separated blocks which are connected with each other by means of the mount bolt 53, one of which blocks, a first block, has a first face opposite to the disc D and a fixed pad (not shown) screwably fixed thereto by means of a fixing bolt, while a second block having a second face is insertibly provided with a ball, a cam and a movable pad (all not shown), which movable pad is screwed to a brake shaft 55 of a brake arm 54 through a fixing bolt, whereby the rotation of brake arm 54 causes the movable brake pad to be pressed in contact with the disc D through a spring means inserted between the brake arm 54 and the second block.

In this disc brake, the first support is, as indicated by the numeral reference 56, fixed to only the bracket member and the brake arm 54 serves as the second support.

This disc brake is, as the same as the center-pull calliper brake, composed of a first support which is fixed thereto and a second support which is only swinging; accordingly, the relative movement is similar to the side-pull calliper brake system and so with the adjusting function.

As clearly understood from the abovementioned description of the invention, the relative length between the outer cable and the operating wire is adjustable in every braking action and such adjustment is available only when both members supporting the cable and wire respectively become movable over a given range, thereby making it possible to carry out the adjustment exactly and accurately.

Accordingly, a brake pad face and a brake-exerted object surface may be always maintained at a proper spaced interval therebetween, thereby being capable of always securing an exact brake action of a bicycle.

Furthermore, the invention is directed to employ a clutch spring so as to be simple in construction and precise in adjustment, namely, minutely adjustable in any minimum difference in a relative length between an inner wirer and an outer cable, thereby making it possible to exactly exert the brake of a bicycle. Also, there is such an advantage that in replacing brake pads or the like by new ones the relative length of the same is capable of being easily restored to a previous unadjusted condition.

While an embodiment of the invention has been shown and described, the invention is not limited to the specific construction thereof, which is merely exemplified in the specification rather than defined.

What is claimed is:

1. An automatic adjusting device for a bicycle brake, which exerts the brake by means of stretching of an inner wire of a control cable comprising an outer cable and said inner wire, said adjusting device comprising;
   a. an adjusting member for retaining in a position one terminal of said outer cable, said adjusting member being provided at the center thereof with a through hole for inserting said inner wire therein and also at the outer periphery of the end portion thereof with a screw thread,
   b. a first supporting member supporting said adjusting member,
   c. a second supporting member supporting one terminal of said inner wire, said second supporting member being movable relative to said first supporting member by means of stretching of said inner wire,
   d. an actuator which is fixed to said second supporting member, said actuator extending toward the retaining position of one terminal of said outer cable and being provided at the intermediate portion thereof with a control groove, and
   e. a clutch spring composed of a coil spring between said actuator and said adjusting member, said clutch spring being engageable at one end thereof with said control groove for permitting said adjusting member to be movable through said spring when the relative movement between said first and second supporting members exceeds a given range of stretch of said wire in action, wherein the control groove of said actuator is made larger in width than a wire diameter of said clutch spring so that a straight end of said clutch spring may be engageable with said control groove for being movable therein, and at the same time, a range of said movement is a proper clearance necessary to exert the brake.

2. An automatic adjusting device for a bicycle brake, which exerts the brake by means of stretching an inner wire of an operating cable comprising an outer cable and said inner wire, said adjusting device comprising;
   a. an adjusting member retaining in a position one terminal of said outer cable thereto, said adjusting member being provided at the center thereof with a through hole for inserting the inner wire therein and also at the outer periphery of the end portion thereof with a screw thread, b. a first supporting member for supporting said adjusting member, said first supporting member having a threaded hole screwably engageable with the screw thread of said adjusting member, c. a clutch spring coiled onto the outer periphery of said adjusting member, said clutch spring being formed of a coil spring one end of which is formed in a straight end extending radially outwardly of said adjusting member, d. a second supporting member for retaining one terminal of said inner wire, said second supporting member and said first supporting member being movable relative to each other, and e. an actuator fixed to said second supporting member, said actuator extending toward the retaining position of one terminal of said outer cable and being provided at the intermediate portion thereof with a control groove receiving the straight end of said clutch spring so that said adjusting member may be rotated through said spring when a relative movement between said first and said second members exceeds a given range of stretch of said wire in action.

3. The automatic adjusting device as set forth in claim 2, wherein said adjusting member is composed of a retainer member for retaining one terminal of the outer cable and an adjusting means having the screw thread, said adjusting means being rotatably contacted with the retaining member.

4. An automatic adjusting device for a bicycle brake, which exerts the brake by means of stretching of an inner wire of an operating cable comprising an outer cable and said inner, said adjusting device comprising;

a. an adjusting member for retaining one terminal of said outer cable, said adjusting member being provided at the center thereof with a through hole for inserting said inner wire therethrough and also at the outer periphery of the utmost end thereof with a screw thread, b. a rotary member screwably engageable with the screw thread of said adjusting member, c. a clutch spring coiled onto the outer periphery of said rotary member, said clutch spring comprising a coil spring of which one end is formed in a straight end extending radially outwardly of said adjusting member, d. a first supporting member supporting said adjusting member through said rotary member, said first supporting member being provided with a through hole which receives the head of said adjusting member to make said adjusting member nonrotatable, e. a second supporting member supporting one terminal of said inner wire, said second supporting member and said first supporting member being movable relative to each other, and f. an actuator fixed to said second supporting member, said actuator being provided with a control groove for receiving the straight end of said spring so that said adjusting member may be moved in an axial direction through said spring when a relative movement between said first and second supporting members exceeds a given range of stretch of said wire in action.

5. The automatic adjusting device as set forth in claim 4, wherein a cylindrical detent is nonrotatably mounted to said second supporting member, said detent receiving into a center hole thereof said adjusting member in a relationship of being only freely movable therewith and also being brought into contact with said rotary member.

* * * * *